United States Patent [19]

Miller

[11] Patent Number: 5,523,637

[45] Date of Patent: Jun. 4, 1996

[54] PERMANENT MAGNET ELECTRICAL MACHINE WITH LOW RELUCTANCE TORQUE

[75] Inventor: John M. Miller, Saline, Mich.

[73] Assignee: Ford Motor Company, Dearborn, Mich.

[21] Appl. No.: 234,030

[22] Filed: Apr. 28, 1994

[51] Int. Cl.$^6$ .................................................. H02K 21/12
[52] U.S. Cl. ......................... 310/156; 310/152; 310/254
[58] Field of Search .................................... 310/254, 179, 310/156, 152, 162, 163, 164, 165, 49 R, 216; 318/701

[56] References Cited

U.S. PATENT DOCUMENTS

| | | |
|---|---|---|
| 3,482,156 | 12/1969 | Porath . |
| 3,696,260 | 10/1972 | Lace . |
| 4,672,253 | 6/1987 | Tajima et al. . |
| 4,678,954 | 7/1987 | Takeda et al. . |
| 4,823,038 | 4/1989 | Mizutani et al. . |
| 4,890,024 | 12/1989 | Hashimoto et al. . |
| 4,972,112 | 11/1990 | Kim ........................................ 310/156 |
| 5,028,073 | 7/1991 | Harms et al. ............................ 310/156 |
| 5,148,090 | 9/1992 | Oku et al. . |
| 5,220,228 | 6/1993 | Sibata ..................................... 310/254 |
| 5,250,867 | 10/1993 | Gizaw .................................... 310/179 |
| 5,254,892 | 10/1993 | Bosman et al. ......................... 310/49 R |

FOREIGN PATENT DOCUMENTS 63-194552  8/1988  Japan .

OTHER PUBLICATIONS

"Effect of Groove of Teeth on Cogging Torque of Three–Phase Permanent Magnet Motor", by Hazumi et al, pp. 927–932.

"Brushless DC Motors Using Unsymmetrical Field Magnetization", by Kusko et al; IEEE Transactions On Industry Applications, vol. IA–23, No. 2, Mar./Apr. 1987; pp. 319–326.

Primary Examiner—R. Skudy
Attorney, Agent, or Firm—Mark S. Sparschu; Roger L. May

[57] ABSTRACT

A permanent magnet synchronous motor includes a permanent magnet rotor and a stator having wound teeth facing the rotor. The stator teeth each include notches having equal width and having a spacing also equal to the notch width. Further, each adjoining two teeth are separated by a gap having a width equal to the width of the notches on the teeth.

The permanent magnet synchronous motor thus configured provides substantial reductions in reluctance torque, or "cogging torque" over prior art permanent magnet synchronous motors. Further, the frequency of the reluctance torque is increased, a desirable condition, with respect to prior art permanent magnet synchronous motors.

13 Claims, 2 Drawing Sheets

PERMANENT MAGNET ELECTRICAL MACHINE WITH LOW RELUCTANCE TORQUE

BACKGROUND OF THE INVENTION

1. Field of the Invention

The present invention relates to electric machines generally, and more specifically to permanent magnet synchronous machines.

2. Description of the Related Art

Electric motors are used in many applications. One type of electric motor, the permanent magnet synchronous motor, provides advantages for some of these applications. Permanent magnet synchronous motors can provide very high power density (that is, a large amount of power output per unit of physical size of the motor).

In a typical permanent magnet synchronous motor, a generally-cylindrical rotor comprises circumferentially-disposed permanent magnet poles. Opposing the rotor is a generally-cylindrical stator. The stator has teeth facing the permanent magnet poles. The teeth are wound with coils of wire such that supplying electric current to the coils magnetizes the teeth. When alternating current is applied to the coils, interaction between the permanent magnet rotor poles and the stator teeth motivates the rotor to rotate.

Magnetic circuits exist in a permanent magnet synchronous motor, the magnetic circuits including, among other things, the permanent magnet rotor poles, the stator teeth, and the air gap between the rotor and the stator. At any instant in the rotation of the rotor, those magnetic circuits will each have a reluctance. The reluctances of the various magnetic circuits change as, for example, a magnetic pole of the rotor transitions from being opposite a tooth of the stator to being opposite a gap between teeth.

In the use of a permanent magnet synchronous motor, reluctance torque or "cogging torque" can be a concern. Reluctance torque is generated due to changes in reluctance of magnetic circuits in the motor as the rotor rotates. When a change in reluctance occurs, a torque (unintended in the design of the motor) is produced. That torque is usually quite small with respect to the intended torque which the motor produces. However, that torque may be large enough to be disruptive in a number of applications for permanent magnet motors, such as electric power steering and electric suspensions for motor vehicles. In such applications, the reluctance torque may be enough to be felt by people in the motor vehicle.

Notching of the teeth of a permanent magnet synchronous motor has been used in an attempt to reduce reluctance torque. For example, U.S. Pat. No. 5,028,073, issued to Harms et al., discloses a permanent magnet motor with notched stator teeth. Although the design disclosed in the patent provides some benefit, further reductions in reluctance torque are still necessary for some applications of permanent magnet synchronous motors.

Therefore, a permanent magnet synchronous motor which can further reduce reluctance torque will provide advantages over the prior art.

SUMMARY OF THE INVENTION

The present invention provides a permanent magnet electrical machine which has a generally-cylindrical permanent magnet rotor having an even number of circumferentially-disposed permanent magnet poles. The permanent magnet electrical machine also has a generally-cylindrical stator disposed in opposition to the rotor. The stator has a plurality of circumferentially-disposed teeth facing the rotor, the number of teeth being one and one-half times the number of permanent magnet poles. The teeth are disposed so as to have a gap of substantially equal width between each adjoining two teeth. Further, each tooth has a plurality of notches, each notch with a width substantially equal to the width of the gaps between teeth. Each adjacent two notches further have a spacing substantially equal to the width of the gaps between teeth. The rotor of the permanent magnet electrical machine is rotatably mounted with respect to the stator.

The present invention also provides a permanent magnet electrical machine having a generally-cylindrical permanent magnet rotor having four circumferentially-disposed permanent magnet poles. The permanent magnet electrical machine also has a generally-cylindrical stator disposed in opposition to the rotor, the stator having six circumferentially-disposed teeth facing the rotor. The stator teeth are disposed so as to have a gap of approximately six degrees between each adjoining two teeth. The rotor is rotatably mounted with respect to the stator.

In addition, the present invention provides a permanent magnet electrical machine which has a generally-cylindrical rotor having at least one ring magnet mounted on a shaft. The rotor has two pairs of permanent magnet poles, the poles having an interpolar spacing of approximately three degrees. The permanent magnet electrical machine also has a generally-cylindrical stator disposed in opposition to the rotor, the stator comprising six teeth facing the rotor. Each tooth has four notches, the notches being approximately six degrees wide and six degrees apart and the teeth spaced approximately six degrees apart.

The present invention provides a considerable reduction in reluctance torque over prior art permanent magnet machines. Because reluctance torque is generally an undesirable feature of a permanent magnet machine, the reduction in reluctance torque realized by the present invention provides an advantage over the prior art.

DETAILED DESCRIPTION OF THE PREFERRED EMBODIMENT

Figures 1, 2:
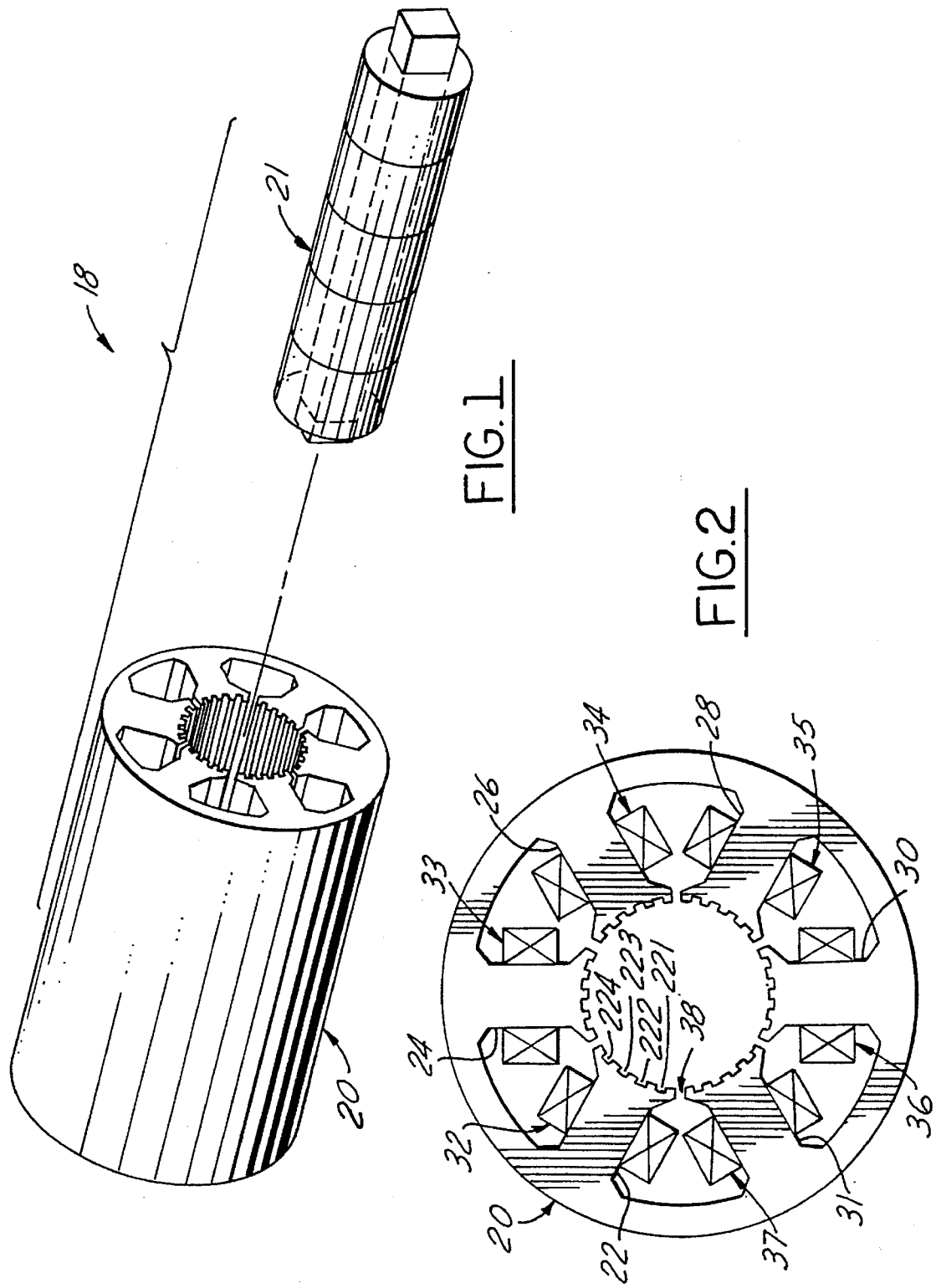
FIG. 1 is a perspective view of a motor 18 according to the present invention.
FIG. 2 is an end view of stator 20 of motor 18 of FIG. 1, with coils 32, 33, 34, 35, 36 and 37 shown in cross-section.

Referring to FIG. 1, a motor 18 according to the present invention is illustrated. Motor 18 comprises a stator 20 and a rotor 21 rotatably mounted within stator 20.

Stator 20 is further illustrated with reference to FIG. 2. Stator 20 comprises six teeth 22, 24, 26, 28, 30 and 31. The base of each tooth is wound with a coil, for example coil 32 wound around tooth 22. (For clarity of illustration, the coils were not illustrated in FIG. 1). The application of alternating current electric power to the coils causes rotor 21 (FIG. 1) to rotate. In the preferred embodiment of the present invention, motor 18 is a three-phase motor. Therefore, two of the teeth are each wound with a coil connected to one phase. That is, coils 32 and 35 about teeth 22 and 28 are connected to one phase, coils 33 and 36 about teeth 24 and 30 are connected to a second phase, and coils 34 and 37 about teeth 26 and 31 are connected to a third phase.

In the preferred embodiment of the present invention, each of teeth 22, 24, 26, 28, 30 and 31 comprises four notches. For example, tooth 22 comprises notches 221, 222, 223 and 224. The notches on teeth 22, 24, 26, 28, 30 and 31 are all of substantially equal widths. Furthermore, the adjacent notches on a given tooth are equally spaced from one another, the spacing being substantially equal to the notch widths. Furthermore, the gap between each two teeth (for example, gap 38 between teeth 22 and 31) is equal to the notch widths. In the preferred embodiment of the present invention, the notches, notch spacings, and gaps between teeth are all approximately six mechanical degrees in width. (In this disclosure, the term "mechanical degrees" is used to distinguish from "electrical degrees", a term also used in electrical machine terminology. For the purposes of this disclosure, a "mechanical degree" is defined as follows: an arc extending one "mechanical degree" subtends 1/360th of a circle).

Figure 3:
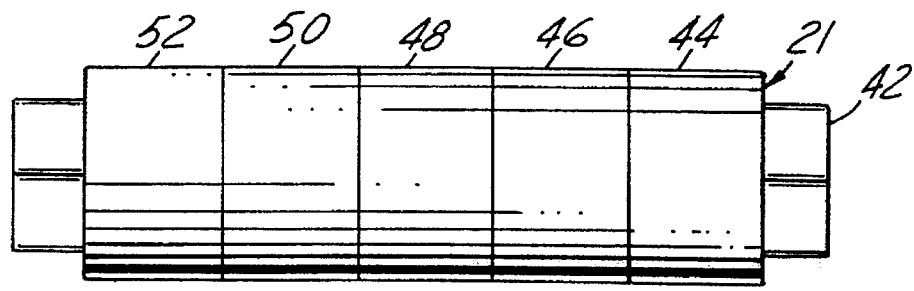
FIG. 3 is an elevation view of rotor 21 of motor 18 of FIG. 1.
Figure 4:
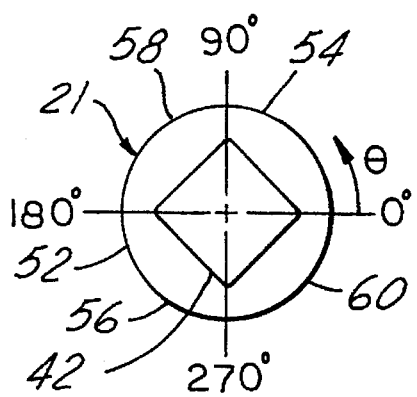
FIG. 4 is an end view of rotor 21.

Referring to FIG. 3, rotor 21 comprises shaft 42. Mounted on shaft 42 are five ring magnets 44, 46, 48, 50 and 52. As shown in FIG. 4, it is preferred that ring magnets 44, 46, 48, 50 and 52 have square center openings and that shaft 42 has a square cross-section. Retention of ring magnets 44, 46, 48, 50 and 52 on shaft 42 is thus facilitated. Preferably, ring magnets 44, 46, 48, 50 and 52 are made of MAGNE-QUENCH MQ2 magnetic material from Delco-Remy Division of General Motors Corporation. Further, to facilitate assembly of rotor 21, ring magnets 44, 46, 48, 50 and 52 are preferably placed on shaft 42 prior to magnetization.

Figure 5:
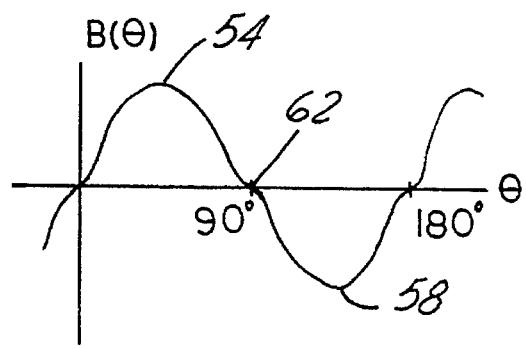
FIG. 5 is a graph showing a portion of the magnetization characteristic of rotor 21.

Also shown in FIG. 4, rotor 21 has two north permanent magnet poles 54 and 56 and two south permanent magnet poles 58 and 60. FIG. 5 shows the intensity and polarization of the magnetic flux density B of the rotor's magnetic field as a function of angle for part of rotor 21. Note that north pole 54 and south pole 58 are shown in FIG. 5 as the upper and lower portions, respectively, of the graph in FIG. 5. Generally, the magnetic flux density B varies with angle θ in a sinusoidal fashion. However, one area which is not sinusoidal is interpolar spacing 62. Interpolar spacing 62 is located at the transition between north pole 54 and south pole 58. Interpolar spacing 62 is a generally unavoidable consequence of magnetizing rotor 21. A similar interpolar spacing exists between each pair of permanent magnet poles of rotor 21. To minimize reluctance torque, it is important that the interpolar spacings be kept smaller than the gaps between teeth 22, 24, 26, 28, 30 and 31 (FIG. 2). A preferable value of interpolar spacing, which has been demonstrated to be attainable with MQ2 magnetic material, is approximately three degrees.

Finite element analysis has demonstrated that permanent magnet synchronous motor 18, configured as herein described, will demonstrate a very substantial reduction in reluctance torque over prior art permanent magnet synchronous motors. Furthermore, the frequency of the reluctance torque which continues to exist will be considerably higher than in prior art permanent magnet synchronous motors. Higher-frequency reluctance torque is generally less perceptible than lower-frequency reluctance torque.

At a spacing of six mechanical degrees, the gaps between teeth 22, 24, 26, 28, 30 and 31 (FIG. 2) can be fairly narrow, especially if motor 18 is relatively small. Such narrow gaps can cause some difficulty in winding coils 32, 33, 34, 35, 36 and 37 around the bases of teeth 22, 24, 26, 28, 30 and 31. The difficulty would be encountered if the gaps were nearly as narrow as the diameter of the wire which comprises coils 32, 33, 34, 35, 36 and 37. If such difficulty is encountered, stator 20 can be made from arcuate segments. Each tooth can be wound prior to assembly of stator 20. Stator 20 can then be held together with a cylindrical case, or "can", which is disposed about stator 20.

Figure 6:
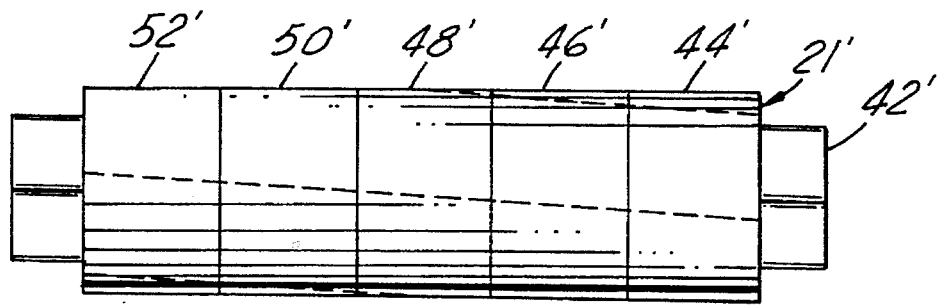
FIG. 6 is an elevation view of an alternative rotor for motor 18 of FIG. 1.

An alternative configuration of a rotor for the motor of the present invention is shown in FIG. 6. Rotor 21' comprises a square shaft 42'. Ring magnets 44', 46', 48', 50' and 52' are mounted on shaft 42'. The magnetization of ring magnets 44', 46', 48', 50' and 52' is skewed over the length of shaft 42' which contains ring magnets 44', 46', 48', 50' and 52'. Preferably, the magnetization is skewed by an amount equal to the width of the gaps between teeth 22, 24, 26, 28, 30 and 31 (FIG. 2). Because the gaps between teeth 22, 24, 26, 28, 30 and 31 are six mechanical degrees wide in the preferred embodiment of the present invention, the skewing of the magnetization of ring magnets 44', 46', 48', 50' and 52' over the length of shaft 42' containing ring magnets 44', 46', 48', 50' and 52' would also be six degrees.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A permanent magnet electrical machine comprising:

a generally-cylindrical permanent magnet rotor having an even number of circumferentially-disposed permanent magnet poles; and a generally-cylindrical stator disposed in opposition to said rotor, said stator comprising a plurality of circumferentially-disposed teeth facing said rotor, the number of said teeth being one and one-half times said number of circumferentially-disposed permanent magnet poles, said teeth being disposed so as to have a gap of substantially equal width between each adjoining two teeth, each said tooth having a plurality of notches, each said notch with a width substantially equal to said width of said gaps, each adjacent two said notches having a spacing substantially equal to said width of said gaps;

wherein said rotor is rotatably mounted with respect to said stator.

2. A permanent magnet electrical machine as recited in claim 1 wherein each pair of adjoining said permanent magnet poles have an interpolar spacing less than said width of said gaps.

3. A permanent magnet electrical machine as recited in claim 2 wherein said number of said permanent magnet poles is four and said number of teeth is six.

4. A permanent magnet electrical machine as recited in claim 3 wherein said teeth are spaced approximately six mechanical degrees apart and each said tooth has four notches.

5. A permanent magnet electrical machine as recited in claim 4 wherein said interpolar spacing is approximately three degrees.

6. A permanent magnet motor as recited in claim 5 wherein said rotor is mounted within said stator and wherein said rotor comprises a shaft and at least one ring magnet mounted on said shaft along a length of said shaft.

7. A permanent magnet electrical machine as recited in claim 6 wherein said poles are skewed along the length of said rotor containing said at least one ring magnet.

8. A permanent magnet motor as recited in claim 7 wherein said skewing is approximately six degrees over the length of said rotor containing said at least one ring magnet.

9. A permanent magnet electrical machine comprising:
   a generally-cylindrical permanent magnet rotor having four circumferentially-disposed permanent magnet poles; and
   a generally-cylindrical stator disposed in opposition to said rotor, said stator comprising six circumferentially-disposed teeth facing said rotor, said teeth being disposed so as to have a gap of approximately six degrees between each adjoining two teeth;
   wherein said rotor is rotatably mounted with respect to said stator.

10. A permanent magnet electrical machine as recited in claim 9 wherein said permanent magnet poles have an interpolar spacing less than six mechanical degrees.

11. A permanent magnet electrical machine as recited in claim 10 wherein said interpolar spacing is approximately three mechanical degrees.

12. A permanent magnet electrical machine as recited in claim 11 wherein said rotor comprises a shaft and at least one ring magnet mounted on said shaft.

13. A permanent magnet electrical machine comprising:
   a generally-cylindrical rotor comprising at least one ring magnet mounted on a shaft, said rotor having four circumferentially-disposed permanent magnet poles, said poles having an interpolar spacing of approximately three degrees; and
   a generally-cylindrical stator disposed in opposition to said rotor, said stator comprising six circumferentially-disposed teeth facing said rotor, each said tooth having four notches, said notches being approximately six degrees wide and six degrees apart and said teeth spaced approximately six degrees apart.

* * * * *